Feb. 10, 1931.                    V. JANTSCH                    1,791,815
                                 BATTERY SUPPORT
                              Filed Oct. 27, 1927
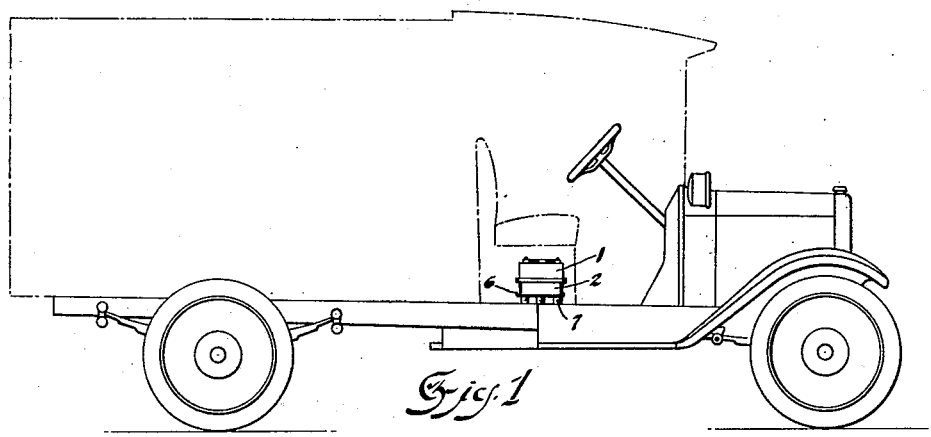
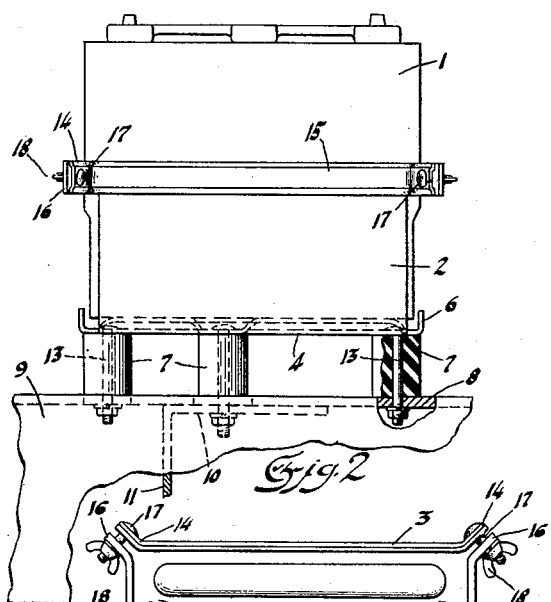
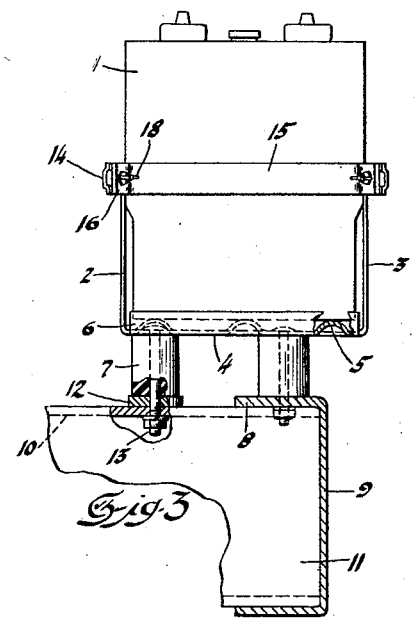
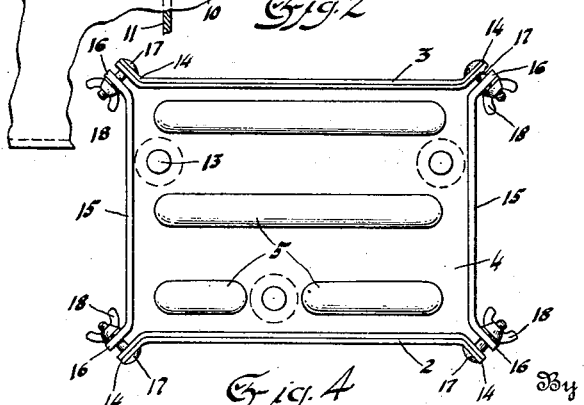
Inventor
Victor Jantsch
By
Blackmore, Spencer & Fliih
Attorneys Patented Feb. 10, 1931

1,791,815

UNITED STATES PATENT OFFICE

VICTOR JANTSCH, OF PONTIAC, MICHIGAN, ASSIGNOR TO YELLOW TRUCK & COACH MANUFACTURING COMPANY, OF PONTIAC, MICHIGAN, A CORPORATION OF MAINE

BATTERY SUPPORT

Application filed October 27, 1927. Serial No. 229,113.

This invention relates to motor vehicles and more particularly to a carrier or mounting by which a storage battery may be removably supported on the vehicle.

One of the primary objects of the invention is to provide an improved support, which comprises but a few parts so as to be simple in construction and economical to manufacture, and which will firmly secure a battery in place without placing any load on the case of the battery.

A further object of the invention is to provide a battery mounting which will cushion shocks and stresses and free the battery of damaging strains incident to frame weaving and vibrations as well as road shocks.

The above and other incidental objects and advantages will be apparent from the following specification and the accompanying drawing, illustrating a preferred embodiment of the invention, and in which Fig. 1 shows by way of illustration a truck chassis with the battery support conveniently carried under the driver's seat, and Figs. 2, 3 and 4 are respectively, a side elevation, an end elevation and a top plan view of the mounting.

Referring to the drawing the storage battery to be removably carried by the vehicle, indicated by the numeral 1, is received between upwardly extending side portions or plates 2 and 3 of a U-shaped member and rests upon and is supported by the bottom cross portion 4 thereof. In order to strengthen and reinforce the weight supporting bottom 4 of the U-shaped member, which is preferably stamped or pressed from sheet metal, the bottom portion is corrugated or provided with a series of parallel curved ridges 5, pressed upwardly from the underside thereof, which stiffen the bottom in one direction and is further provided with upturned flanges 6 at each end, which not only stiffen the bottom in the other direction but also assist in positioning the battery. The bottom 4 being thus made resistant to any tendency to sag under the weight of the battery, evenly distributes the supported weight upon three elastic blocks 7 of rubber, or other suitable material, two of which rest upon the top flange 8, of a channeled side member or sill 9, running longitudinally of the vehicle and forming a part of the chassis frame and the other of which rests upon the top flange 10 of a transverse cross member 11 of the frame, which is received within the channel of the side member 9. A disc or washer 12 equal in thickness to the flange 8 may be inserted between the flange 10 and the rubber block resting thereon, so that the several blocks will be of uniform size and interchangeable. Long fastening bolts 13 passing through apertures or holes in the bottom of the U-shaped member and top flanges of the frame members, also extend through and retain the rubber blocks in place and hold the U-shaped member thereon. Obviously, these resilient blocks 7 will absorb and save the battery structure free from the various vibrations and jars incident to vehicular travel, materially prolonging the life of the battery.

At each end of the respective side plates or upstanding portions 2 and 3 and at the top thereof, is a laterally projecting ear 14 extending outwardly substantially at an angle of 45°. These ears may be formed integrally with the side plates when the U-shaped member is first formed or they may be the outturned ends of a pair of straps welded or otherwise secured along the top margin of the upstanding sides. Bridging the open ends of the U-shaped member are a pair of straps or plates 15, each of which is provided at opposite ends with lateral ears 16, corresponding to the ears 14 and extending at an angle of substantially 45°. The side plates 2 and 3 and end plates or straps 15 constitute in effect a rectangular frame into which the battery is inserted. At each corner of the frame are a pair of angled ears, one on an end plate and the other on a side plate, each pair being connected together by a bolt 17 extending through alined openings in the adjoining ears and carrying a wing nut 18 adjustably screw threaded thereon. By the adjustment of the several wing nuts 18, the ears at each corner will be moved relative to each other, causing the frame to increase or decrease in size. When a battery is to be secured in the mounting, the wing nuts 18 are threaded back to increase the size of the frame beyond that of the battery to be received and after the battery is rested upon the bottom 4, the nuts are drawn up to contract the frame and move the plates into clamping contact with the vertical walls of the battery case. The clamping action, which will be uniformly distributed on all four sides of the battery case, serves to securely hold the battery in place and resists any tendency of the battery to bounce or bump up and down. The manner of clamping the battery in place makes this mounting especially adapted for use with batteries contained within a molded rubber case such as are now coming into great favor, since the large contact surface eliminates distortion of the case, as has been experienced with the conventional hold-down devices heretofore employed.

While the foregoing description has been more or less specific, it is to be understood that the invention is not limited to the exact structural details disclosed, but that such modifications may be made as come within the scope of appended claims.

I claim:

1. A mounting for detachably supporting a storage battery including a rectangular frame comprising a substantially U-shaped member having upstanding portions and adapted to receive a battery between the upstanding portions thereof, a pair of end plates bridging the open ends of said member and means to move said upstanding portions and end plates relatively to each other to vary the size of said frame.

2. A mounting for detachably supporting a storage battery, including a U-shaped member having a bottom plate on which the battery is to be rested and a pair of upstanding side plates integral with the bottom plate, a pair of end straps bridging the space between the side plates at the ends thereof and cooperating with said side plates to afford a rectangular frame to receive the battery therein, the opposite ends of each side plate and end strap terminating in laterally projecting ears, providing a pair of ears at each corner of the frame, one on a side plate and one on an end strap, and fastening bolts passing through apertures in adjoining ears and having adjusting nuts screw threaded thereon, which by their adjustment draw the respective pairs of ears together and move the plates and straps into clamping engagement with the walls of a battery inserted within the frame.

3. A battery mounting including a U-shaped member having a bottom portion forming a rest for a battery and a pair of upwardly extending portions between which a battery may be received, a pair of straps bridging the open ends of said U-shaped member and forming therewith a rectangular frame, a pair of ears at each corner of the frame projecting angularly from one of said upwardly extending portions and an end strap respectively, and means connecting each pair of adjoining ears to draw them together for contracting the frame and causing uniform clamping effect on all sides of the battery to be supported.

4. In a motor vehicle, the combination of a chassis frame and a U-shaped member adapted to receive a storage battery between the upstanding sides thereof, a pair of straps bridging the open ends of said member, means connecting said straps and sides to contract the same into clamping engagement with the vertical walls of the battery, and means to yieldingly support said U-shaped member upon the chassis frame.

In testimony whereof I affix my signature.

VICTOR JANTSCH.